US012577500B2

(12) United States Patent
Friz et al.

(10) Patent No.: US 12,577,500 B2
(45) Date of Patent: Mar. 17, 2026

(54) AQUEOUS ALKALINE CLEANER SOLUTION FOR GLASS FILLER REMOVAL AND METHOD

(71) Applicant: Atotech Deutschland GmbH & Co. KG, Berlin (DE)

(72) Inventors: Wolfgang Friz, Berlin (DE); Laurence John Gregoriades, Berlin (DE); Stefan Kempa, Berlin (DE)

(73) Assignee: Atotech Deutschland Gmbh & Co. KG, Berlin (DE)

( * ) Notice: Subject to any disclaimer, the term of this patent is extended or adjusted under 35 U.S.C. 154(b) by 353 days.

(21) Appl. No.: 18/256,699

(22) PCT Filed: Dec. 10, 2021

(86) PCT No.: PCT/EP2021/085285
§ 371 (c)(1),
(2) Date: Jun. 9, 2023

(87) PCT Pub. No.: WO2022/123050
PCT Pub. Date: Jun. 16, 2022

(65) Prior Publication Data

US 2024/0052266 A1 Feb. 15, 2024

(30) Foreign Application Priority Data

Dec. 11, 2020 (EP) .................................... 20213593

(51) Int. Cl.
*C11D 1/04* (2006.01)
*B08B 3/08* (2006.01)
(Continued)

(52) U.S. Cl.
CPC .............. *C11D 3/2096* (2013.01); *B08B 3/08* (2013.01); *C11D 1/04* (2013.01); *C11D 1/14* (2013.01);
(Continued)

(58) Field of Classification Search
CPC .... C11D 1/04; C11D 1/14; C11D 1/72; C11D 1/722; C11D 3/2075; C11D 3/044
(Continued)

(56) References Cited

U.S. PATENT DOCUMENTS

| | | | |
|---|---|---|---|
| 5,264,047 | A | 11/1993 | Winston et al. |
| 9,447,368 | B1 | 9/2016 | Koo et al. |

(Continued)

FOREIGN PATENT DOCUMENTS

| | | | |
|---|---|---|---|
| EP | 2209134 B1 * | 3/2017 | ....... H01L 21/02057 |
| EP | 3670698 A1 | 6/2020 | |

(Continued)

OTHER PUBLICATIONS

PCT/EP2021/085285; International Search Report and Written Opinion of the International Searching Authority dated Mar. 17, 2022.

*Primary Examiner* — Gregory R DelCotto
(74) *Attorney, Agent, or Firm* — Renner, Otto, Boisselle & Sklar, LLP

(57) ABSTRACT

The invention relates to an aqueous alkaline cleaner solution for glass filler removal comprising: (a) at least one non-ionic surfactant selected from the group consisting of saturated branched or unbranched C5 to C12 carboxylic acid or salt thereof, wherein the concentration of the (a) at least one surfactant is from 0.9 to 1.7 g/L; (b) at least one surfactant selected from the group consisting of saturated branched or unbranched C5 to C12 alkyl having a negatively charged group selected from sulfate, sulfite, sulfonate, phosphate, phosphite and carbonate, and saturated C3-C8 alkyl amino carboxylate; (c) at least one compound having at least one hydroxyl group and at least one C—O—C group selected from the group consisting of alkoxylated C5-C12 alkanol and glycosidic C5-C12 alkanol; and (d) alkali metal hydrox-
(Continued)

ide, wherein the concentration of the (d) alkali metal hydroxide is from 65 to 200 g/L; and a method for use.

20 Claims, 4 Drawing Sheets

(51) Int. Cl.

| | |
|---|---|
| ***C11D 1/14*** | (2006.01) |
| ***C11D 1/34*** | (2006.01) |
| ***C11D 1/72*** | (2006.01) |
| ***C11D 1/722*** | (2006.01) |
| ***C11D 3/04*** | (2006.01) |
| ***C11D 3/20*** | (2006.01) |
| ***C11D 17/00*** | (2006.01) |

(52) U.S. Cl.
CPC .............. *C11D 1/143* (2013.01); *C11D 1/345* (2013.01); *C11D 1/72* (2013.01); *C11D 1/722* (2013.01); *C11D 3/044* (2013.01); *C11D 3/2068* (2013.01); *C11D 3/2075* (2013.01); *C11D 17/0008* (2013.01); *C11D 2111/22* (2024.01)

(58) Field of Classification Search
USPC ................ 510/175, 176, 424, 427, 477, 488
See application file for complete search history.

(56) References Cited

U.S. PATENT DOCUMENTS

| | | | | |
|---|---|---|---|---|
| 2003/0196386 | A1* | 10/2003 | Hattori ................. | C09K 3/1463 106/3 |
| 2004/0161933 | A1* | 8/2004 | Takashima ............. | C11D 3/361 438/689 |
| 2007/0131243 | A1 | 6/2007 | Asahi et al. | |
| 2007/0181534 | A1* | 8/2007 | Kamimura .......... | H01L 21/7684 438/692 |
| 2010/0056416 | A1 | 3/2010 | Scheuing et al. | |
| 2010/0167535 | A1* | 7/2010 | Nishiwaki ............ | C11D 3/2075 438/692 |
| 2010/0311630 | A1* | 12/2010 | Mori ..................... | H01L 21/321 510/175 |
| 2012/0298409 | A1 | 11/2012 | Kwon et al. | |
| 2012/0302482 | A1 | 11/2012 | Tamura | |
| 2013/0035272 | A1* | 2/2013 | Lee ......................... | G03F 7/425 510/176 |
| 2016/0075971 | A1 | 3/2016 | Liu et al. | |
| 2016/0225606 | A1* | 8/2016 | Barr ...................... | H10F 71/121 |
| 2019/0177670 | A1* | 6/2019 | Kamimura ............. | C11D 1/345 |
| 2020/0199500 | A1* | 6/2020 | White .................... | C09K 13/00 |
| 2020/0339919 | A1* | 10/2020 | Mizutani ................ | C11D 7/261 |
| 2022/0025299 | A1* | 1/2022 | Park .................... | H01L 21/3212 |

FOREIGN PATENT DOCUMENTS

| | | | | |
|---|---|---|---|---|
| JP | 2010229536 | A | 10/2010 | |
| SG | 184735 | A1 | 2/2014 | |
| WO | WO-2022076252 | A1 * | 4/2022 | ....... H01L 21/02068 |

* cited by examiner

AQUEOUS ALKALINE CLEANER SOLUTION FOR GLASS FILLER REMOVAL AND METHOD

This application is a national phase of International Application No. PCT/EP2021/085285, filed 10 Dec. 2021, which claims priority to European Patent Application No. 20213593.5, filed 11 Dec. 2020, each of which is hereby incorporated herein by reference in its entirety.

DESCRIPTION

Field of the Invention

The present invention relates to a novel aqueous alkaline cleaner solution for glass filler removal from a substrate comprising a nonconductive layer basing on a composite of organic polymers and glass filler and a copper layer attached to the nonconductive layer, e.g. for use prior to deposition of a palladium activation layer on the substrate and a method and use thereof. In particular the solution and the method is used after a desmear process to further clean-up surfaces having structures as blind micro vias for the manufacturing of articles e.g. multilayer assemblies as printed circuit boards, especially fine line IC substrate boards, wherein circuit features as blind micro vias can be filled with metal.

Background of the Invention

Facing a demand for increasing miniaturization, modern electronics manufacturers must pursue the trend to more and more densely interconnected multilayer printed circuit boards. Owing to their low cost and well-balanced physicochemical and mechanical properties, epoxy-based composites are insulating materials of prime choice. The latest epoxy build up laminates contain increasing amounts of spherical glass filler, which are needed to compensate the CTE mismatch between the epoxy based resin matrix and the electroplated copper circuits. In addition, their small size in the order of μm and below, allows for smoother surface topographies compared to glass fiber bundle reinforced base materials.

After inserting different recesses as traces, blind micro vias or through holes (TH) e.g. by drilling into the resin-based substrate comprising the glass filler, a desmear process is applied to remove residues of the drilling process. During industrial desmear processing the adhesion of the exposed glass filler at the surface of the substrate and at the surface of the recesses will be weakened and their anchoring in the surrounding resin matrix will be lost or damaged. If these fillers will not be removed, the remaining weak-bounded or loose filler may give rise to low adhesion of plated copper on the epoxy resin, as well as contaminated copper to copper connections in blind micro vias or through holes (TH). This can affect yield rates in production and reliability in the final product.

Common approaches to overcome the glass filler contamination include fluoride etch solutions described in US 2012/0298409 A1 and ultrasonic treatment described in US 2007/0131243 A1. Neither of these strategies is easily applicable in the vertical mode of semi additive processing (SAP). The drastic health issues of fluoride etching solutions quickly disqualify them for most parts of the industry, whereas ultrasound application in vertical mode, possibly even in basket application, is extremely difficult to employ in a homogeneous fashion with sufficiently high impact on each panel.

JP 2010-229536 A discloses a pretreatment agent for cleaning surface of a resin substrate containing silica-based filler wherein the filler and the glass fiber shall be removed which are exposed on the substrate surface after desmear treatment etc. The pretreatment agent includes an alkali, a nonionic ether type surfactant, and an amine-based complexing agent.

US 2010/056416 A1 discloses a cleaning composition with a limited number of natural ingredients containing an anionic surfactant, a hydrophilic syndetic selected from a C6 alkylpolyglucoside, nonionic surfactant and a hydrophobic syndetic such as oleic or palmitic acid, wherein the composition has a pH 7 to 13. The cleaning composition can be used to clean laundry, soft surfaces, and hard surfaces.

The aforementioned approaches often contain components which are hazardous to health, showing high energy consumption and having strong foaming behavior. Further, the used solutions do not sufficiently remove loose or weakly attached filler and also tends to undesired foaming. Thus the subsequent substrate activation can lead to the formation of an unspecific and insufficient adhered palladium layer on the surface of the substrate, which can then lead to incomplete copper deposition in the subsequent processes.

Objects of the Invention

Therefore, it is an object of the present invention to overcome shortcomings of the prior art and to provide means for improved removing of loose glass filler from a wide variety of composites having organic polymers and glass filler wherein the filler is exposed on the composite surface including recess structures as through holes, traces or blind micro vias after desmear treatment and have low adhesiveness.

It is a further object of the present invention to provide means for improved removing of glass filler which has less foaming tendency.

It is still another object of the present invention to improve the adsorption and achieving a uniform distributed deposition of a palladium catalyst onto the surface of the substrate imparting the catalyst to enhance adhesiveness of the subsequent copper plating and improve copper adhesion reliability.

It is still another object of the present invention to use the means for the manufacturing of articles e.g. multilayer assembly as fine line HDI boards, MLB and IC substrates.

SUMMARY OF THE INVENTION

These objects are solved with the present invention.

In one aspect of the present invention, an aqueous alkaline cleaner solution for glass filler removal is provided comprising:

(a) at least one surfactant selected from the group consisting of saturated branched or unbranched C5 to C12 carboxylic acid or salt thereof, wherein the concentration of the (a) at least one surfactant is from 0.9 to 1.7 g/L;

(b) at least one surfactant or salt thereof selected from the group consisting of saturated branched or unbranched C5 to C12 alkyl having a negatively charged group selected from sulfate, sulfite, sulfonate, phosphate, phosphite and carbonate, and saturated C3-C8 alkyl amino carboxylate;

(c) at least one compound having at least one hydroxyl group and at least one C—O—C group selected from the group consisting of alkoxylated C5-C12 alkanol and glycosidic C5-C12 alkanol; and (d) alkali metal hydroxide, wherein the concentration of the (d) alkali metal hydroxide is from 65 to 200 g/L.

In another aspect of the present invention, a method is provided for glass filler removal treatment of a desmear treated substrate comprising a nonconductive layer basing on a composite of organic polymers and glass filler and a copper layer attached to the nonconductive layer in manufacturing an article with an integrated circuit, wherein the nonconductive layer has at least one blind micro via (BMV) within the surface of the nonconductive layer, wherein the bottom of the at least one micro via is built by the attached copper layer, wherein the surface of the nonconductive layer which is not attached to the copper layer and the wall of the at least one blind micro via expose desmear treated organic polymers and glass filler, wherein the method comprising the steps in the following order:

(i) providing the desmear treated substrate;

(ii) providing the aqueous alkaline cleaner solution according to the invention;

(iii) treating the substrate with the aqueous alkaline cleaner solution by bringing the substrate into contact with the alkaline cleaner solution in order to remove glass filler from the organic polymer.

In still another aspect of the present invention, the use of the aqueous alkaline cleaner solution is provided for glass filler removal treatment of a desmear treated substrate comprising a nonconductive layer basing on a composite of organic polymers and glass filler and a copper layer attached to the nonconductive layer in manufacturing an article with an integrated circuit, wherein the nonconductive layer has at least one blind micro via within the surface of the nonconductive layer, wherein the bottom of the at least one micro via is built by the attached copper layer, wherein the surface of the nonconductive layer which is not attached to the copper layer and the wall of the at least one blind micro via expose the desmear treated organic polymers and glass filler.

In still another aspect of the invention, the use of the aqueous alkaline cleaner solution or the method according to the invention above is provided for manufacturing of a multilayer assembly having alternating layers of nonconductive layers basing on a composite of organic polymers and glass filler having copper filled recess structures and copper layers attached to the nonconductive layers.

Further aspects of the present invention could be learned from the dependent claims or the following description.

BRIEF DESCRIPTION OF THE DRAWINGS

Features will become apparent to those of ordinary skill in the art by describing in detail exemplary embodiments with reference to the attached drawings in which.

DETAILED DESCRIPTION OF THE INVENTION

Figure 1:
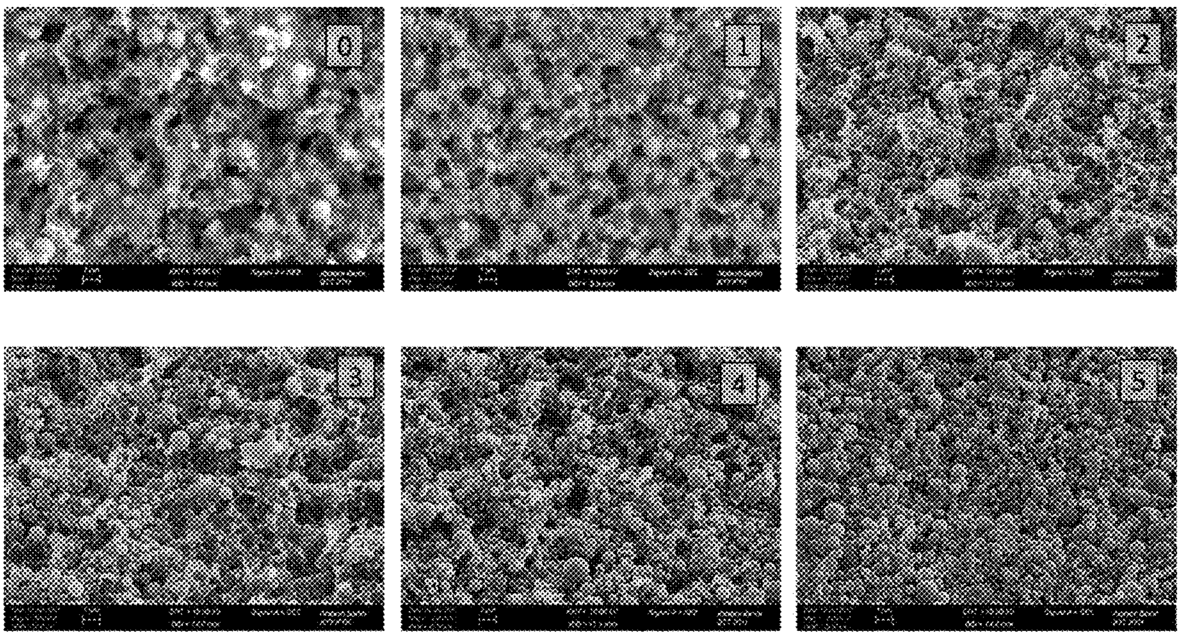
FIG. 1 illustrates the in-house 0-5 level scale to evaluate the performance of glass filler removal by SEM on the surface of the nonconductive layer of the substrate after applying the test solution.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. As used herein, the term “and/or” includes any and all combinations of one or more of the associated listed items. Further, the use of “may” when describing embodiments of the present invention refers to “one or more embodiments of the present invention”.

In the following description of embodiments of the present invention, the terms of a singular form may include plural forms unless the context clearly indicates otherwise, e.g. if in the following ‘filler’ is used ‘fillers’ is included.

The present invention is in particular suited to be used after desmear treatment and before palladium activation of the substrates according to the invention, wherein the composites having increasing amounts of glass filler as spherical glass filler, being e.g. part of SAP base materials. With the present invention it is possible to remove the exposed glass filler from the surface and also from walls of BMVs which became loose or less attached during desmear process. The invention provides cleaned surfaces of the substrate and the walls of the BMVs for subsequent metallization processes starting with palladium activation.

The invention leads to higher yield rates and better reliability of the manufactured multilayer assemblies as printed circuit boards wherein the adhesion properties on industrially relevant IC substrate base materials have shown significantly higher peel strength values after treatment with the new process.

In particular the invention enables the manufacturing of electronic article e.g. a multilayer assembly as HDI and MLB boards and IC substrate article with fine features wherein lines and spaces (L/S) of 75/75 or down to 25/25 μm and e.g. for horizontal applications to aspect ratios of through hole of about 1:3 to about 1:10 and preferably blind micro via of about 1:1 or down to 1:1.15-1:2.3. For vertical plating applications aspect ratios of through hole of about 1:3 to about 1:30 and preferably blind micro via of about 1:1 or down to 1:1.15-1:2.3 are possible. At the same time, the process provides excellent coverage performance while significantly reducing foaming behavior.

The invention uses less hazardous components than used in the prior art. Further the invention enables the manufacturing of electronic article under milder conditions in view of working temperature and working time. This leads to considerable reduced energy consumption and improves throughput. Lower temperature schemes also reduce the equipment and maintenance costs.

Beside reduced foaming behavior, one of the most desired benefits of cleaning desmear treated substrate surfaces from loose glass filler is an increase of adhesion of the plated copper to the underlying e.g. epoxy matrix. An obvious reason for anticipating this adhesion increase would be to assume an insufficient bonding of 'loose' glass filler to the substrate. This should be the case for filler that is less than half embedded in the surrounding epoxy resin after desmear or for any re-adsorbed filler. Copper is then plated around this filler and upon exertion of peeling forces, they are easily lifted from the substrate.

The invention can be used in a wide range of different substrates of different suppliers wherein nonconductive layer of the substrate is basing on a composite of organic polymers and glass filler, wherein the copper layer is attached to the nonconductive layer e.g. by lamination.

The composite is basing on mixture of glass filler and/or silica filler with organic polymers as resins and/or plastics, and blends thereof. Resins and plastics include dielectric materials typically used in the electronics industry which are to be metallized. Resins and plastics are preferably selected from epoxy as epoxy resin, isocyanate resin, bismaleimide triazine resin, and phenylene resin; polyester such as polyethylene terephthalate (PET), polyimide (PI), polytetrafluorethylene, acrylonitrile-butadiene-styrene (ABS) copolymer, polyamide (PA), polycarbonate (PC) as well as mixtures and blends of the aforementioned.

The organic polymers more preferably comprise polyimide resins or epoxy resins wherein the polyimide resins can be modified by the addition of polysiloxane, polycarbonate, polyester or the like. The epoxy resins can be glass filler epoxy board material comprising a combination of the epoxy resin and glass filler, or the same modified to have a low thermal expansion and a high glass-transition temperature, constituting a high glass-transition temperature glass filler epoxy board material.

Suitable glass filler is preferably selected from borosilicate glass, quartz glass, silica glass, fluorinated glass. The size of different filler has a range from 0.01 μm to 5 μm in diameter with preferably an average of 0.5 μm in diameter.

Preferable the composite of the nonconductive layer is a build-up film, e.g. epoxy base materials. Detailed names will be given where necessary. The size of the embedded glass filler has an average of 0.5 μm in diameter, with a maximum of 5.0 μm.

The desmear treated substrate according to the invention can comprise a core layer. In this case the copper layer attached to the nonconductive layer is further attached to the core layer. This core layer makes the handling of the more flexible desmear treated substrate easier and avoids undesired twisting of the substrate.

In a further embodiment, two desmear treated substrates can be attached to the core layer. In this case, each copper layer is attached to the nonconductive layer and to the core layer. This enables the desmear treated substrate having a core layer to be treated from both sides to build up multilayer assemblies from both sides of the core layer.

The aforementioned core layer can be selected from the group consisting of printed circuit board substrates, circuit carrier substrates, interconnect devices substrates and precursors for any of the aforementioned. Such precursors include inter alia FR-1, FR-2, FR-3, FR-4, FR-5, copper-clad materials, SAP material, an IC substrate and laminates thereof, preferably the core layer is a FR4 material, SAP material or an IC substrate. The concentration of the at least one surfactant (a) in aqueous alkaline cleaner solution is from 0.9 to 1.7 g/L, preferably from 1.0 to 1.5 g/L, more preferably from 1.2 to 1.4 g/L. In case of two or more surfactants in the solution, the total concentration is also from 0.9 to 1.7 g/L, preferably from 1.0 to 1.5 g/L, more preferably from 1.2 to 1.4 g/L. It is understood that the surfactant can be added as acid or salt.

The concentration of the at least one surfactant (b) in aqueous alkaline cleaner solution is from 0.5 to 10 g/L, preferably from 1.5 to 9 g/L, more preferably from 2 to 8 g/L. Other preferred concentration ranges are from 0.5 to 1.2 g/L, preferably from 0.7 to 1.1 mg/L more preferably from 0.75 to 1.0 g/L. In case of two or more surfactants in the solution, the total concentration is also from 0.5 to 10 g/L. In one preferred embodiment the concentration range of the at least one surfactant (b) selected from the group consisting of saturated branched or unbranched C5 to C12 alkyl having a negatively charged group selected from sulfate, sulfite, sulfonate phosphate, phosphite and carbonate is from 0.5 to 1.2 g/L, preferably from 0.7 to 1.1 mg/L more preferably from 0.75 to 1.0 g/L. In another preferred embodiment the concentration range of the at least one surfactant (b) selected from the group consisting of saturated C3-C8 alkyl amino carboxylate 0.5 to 10 g/L, preferably from 1.5 to 9 g/L, more preferably from 2 to 8 g/L.

The concentration of the at least one compound (c) having at least one hydroxyl group and at least one C—O—C group in aqueous alkaline cleaner solution is from 0.7 to 1.3 g/L, preferably from 0.8 to 1.2 g/L more preferably from 0.9 to 1.1 g/L. In case of two or more alkanols in the solution, the total concentration is also from 0.7 to 1.3 g/L, preferably from 0.8 to 1.2 g/L more preferably from 0.9 to 1.1 g/L.

The concentration of the (d) alkali metal hydroxide leads to a pH value, which is strongly alkaline and has calculative a higher pH value than pH 14. The concentration of the (d) alkali metal hydroxide in aqueous alkaline cleaner solution is from 65 to 200 g/L, preferably from 70 to 100 g/L, more preferably from 75 to 90 g/L.

It is noted that, throughout the specification and claims, the numerical limits of the disclosed ranges and ratios may be combined, and are deemed to include all intervening values. Furthermore, all numerical values are deemed to be preceded by the modifier "about", whether or not this term is specifically stated.

The at least one surfactant is selected from the group consisting of saturated branched or unbranched C5 to C12 carboxylic acid or salt thereof and is preferably a saturated branched C6 to C10 carboxylic acid or salt, preferable hexanoic acid, octanoic acid and decanoic acid or salt thereof, most preferably hexanoic acid and octanoic acid or salt thereof. The surfactant selected from the group consisting of saturated unbranched C6 to C10 carboxylic acid or salt, more preferably saturated unbranched C6 to C8 carboxylic acid or salt is preferably unsubstituted hexanoic acid and octanoic acid.

The at least one surfactant selected from the group consisting of saturated branched or unbranched C5 to C12 alkyl having a negatively charged group selected from sulfate, sulfite, sulfonate, phosphate, phosphite and carbonate is preferably selected from the group consisting of saturated branched or unbranched C5 to C8 alkyl, e.g. n-pentyl, iso-pentyl, n-hexyl, 2-ethylhexyl, n-heptyl, or n-octyl, having a negatively charged group of sulfate, phosphate and carbonate, more preferably having a negatively charged group of sulfate, most preferably the surfactant is sodium 2-ethylhexyl sulfate or sodium iso-heptyl sulfate.

The positive counter ion of the saturated branched or unbranched C5 to C12 alkyl having a negatively charged group is preferably sodium or potassium, more preferably sodium.

The saturated C3-C8 alkyl amino carboxylate is preferably a compound of formula (III) or (IV)

(III)

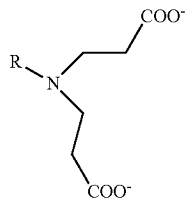

wherein R is branched or unbranched C4-C8 alkyl, e.g. n-pentyl, iso-pentyl, n-hexyl, 2-ethylhexyl, n-heptyl, n-octyl.

or (IV)

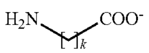

wherein k is an integer from 3 to 8, preferably from 4 to 6, most preferred 6.

It is understood, that the surfactant is preferably added as salt. The positive counter ion of the saturated C3-C8 alkyl amino carboxylate is preferably sodium or potassium, more preferably sodium.

The alkoxylated C5-C12 alkanol of compound (c) is preferably a compound of formula (I)

(I)

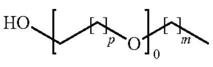

wherein p is an integer from 1 to 2, o is an integer from 4 to 10 and m is an integer from 4 to 9, more preferably p is 1, o is from 5 to 7 and m is from 5 to 7. Most preferably the alkoxylated C5-C12 alkanol is ethoxylated hexanol or ethoxylated octanol wherein o is 6.

The average MW (Molecular Weight) of the compound of formula (I) is from 200 to 15000 g/mol, preferably from 400 to 1000 g/mol, most preferably from 300 to 600 g/mol.

The glycosidic C5-C12 alkanol of compound (c) is preferably a compound of formula (II)

(II)

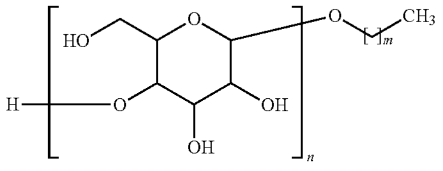

wherein n is an integer from 1 to 5 and m is an integer from 4 to 9, preferred from 5 to 7. Preferably the compound is an alkylpolyglucoside (APG) provided under CAS 54549-24-5.

Preferably the alkali metal hydroxide is sodium hydroxide or potassium hydroxide, more preferred sodium hydroxide.

In a preferred embodiment, the aqueous alkaline cleaner solution of the present invention comprises the (a) at least one surfactant selected from the group consisting of hexanoic acid and octanoic acid or salt thereof; the (b) at least one surfactant selected from the group consisting of sodium 2-ethylhexyl sulfate (sodium etasulfate), sodium iso-heptyl sulfate and alkyl amino carboxylate according to formula (III) wherein R is 2-ethylhexyl or n-octyl, and according to formula (IV) wherein k is from 4 to 6; the (c) at least one compound selected from the group consisting of a alkoxylated C5-C12 alkanol, being a compound of formula (I) wherein the compound is ethoxylated hexanol, ethoxylated octanol or ethoxylated decanol wherein o is 6, and a glycosidic C5-C12 alkanol, being a compound of formula (II) wherein n is an integer from 1 to 5 and m is an integer from 5-7; and (d) is sodium hydroxide. In a more preferred embodiment, the aqueous alkaline cleaner solution of the present invention further comprises (e) at least one water-soluble alkanolamine.

In a more preferred embodiment, the inventive aqueous alkaline cleaner solution comprises the following combinations of (b) sodium etasulfate and (c) ethoxylated hexan-1-ol; (b) 1-amino-hexyl carboxylate and (c) ethoxylated decan-1-ol; or (b) APG and (c) 2-ethylhexyl imino dipropionate. Preferably these combinations are used together with (a) hexanoic acid and (d) sodium hydroxide. In an even more preferred embodiment the foregoing combinations are used together with monoethanolamine. Most preferred the inventive aqueous alkaline cleaner solution consists of the foregoing combinations.

Preferably the aqueous alkaline cleaner solution comprises additionally (e) at least one water-soluble alkanolamine, selected from the group consisting of monoethanolamine (MEA), diethanolamine (DEA) and triethanolamine (TEA), preferably 2-aminoethanol. By using the water-soluble alkanolamine clouding of the solutions can be avoided. In own experiments it could be shown, that clouded solutions leads to undesired plating results.

The concentration of the at least one water-soluble alkanolamine is from 6.5 to 9.0 g/L, preferably from 7.5 to 8.5 g/L, more preferably from 7.8 to 8.2 g/L.

The inventive method using the inventive solution is preferably used directly after a desmear process. Optionally the desmear treated substrate is pre-treated with a step (0) treating the desmear treated substrate with an aqueous conditioner solution before applying step (i) providing the desmear treated substrate according to the method of the present invention. The step (0) treating the desmear treated substrate with an aqueous conditioner solution can improve the subsequent treating step with the inventive aqueous alkaline cleaner solution. The conditioner solution preferably comprises an acid such as sulfuric acid or hydrochloric acid, an agent capable of reducing manganese dioxide such as hydroxylammonium sulfate or hydrogen peroxide and a polymer containing quaternized nitrogen atoms. E.g. Securiganth® MV Reduction Conditioner available from Atotech Deutschland GmbH can be used as conditioner solution. The treatment with the conditioner solution can be part of a desmear process.

The method can be used in vertical and horizontal plating equipment. Preferably the method is used in vertical plating equipment, wherein the substrate is conveyed by a transport device to be processed through the treatment modules of the plating equipment.

The inventive method is preferably used, if the (iii) treating is conducted at 55 to 65° C. for 3 to 7 min. The low temperature reduces the energy consumption and also reduces equipment costs for using higher temperatures. Besides this, the evaporation of low boiling components can be prevented and has strong suction can be avoided.

The inventive method is preferably used before activation, e.g. palladium activation, of the surface of nonconductive layer of the desmear treated substrate for subsequent metallization of the substrate for the manufacturing an article with an integrated circuit e.g. multilayer assemblies as fine line HDI boards, MLB and IC substrate articles.

Therefore the method can as non-limiting example preferably further comprise the following steps in manufacturing the article.

(iv) treating the substrate of step (iii) with an activation solution onto the surfaces of the nonconductive layer of the treated substrate of step (iii) for subsequent metallization; preferably treating the substrate of step (iii) with a palladium activation solution wherein a palladium ion layer is deposited onto the surfaces of the nonconductive layer of the treated substrate of step (iii). Other useful activation solution known in the art may comprise carbon, conductive polymers or metal colloids containing e.g. copper, palladium, palladium-tin, for subsequent electrolytic direct metallization.

The palladium activation solution comprises at least one source of palladium ions. Additionally the solution may comprise other sources of metal ions, as sources of ruthenium ions, sources of rhodium ions, sources of palladium ions, sources of osmium ions, sources of iridium ions, sources of platinum ions, sources of copper ions, sources of silver ions, sources of nickel ions, sources of cobalt ions, sources of gold ions and mixtures thereof. The palladium ions and said additional metal ions are being adsorbed on the surface of said substrate.

(v) treating the substrate of step (iv) in case a palladium activation solution was used with palladium reduction solution wherein the deposited palladium ion layer in step (iv) is transformed into a metallic palladium layer.

Treating the surface of substrate comprising at least the palladium ions is conducted with a solution comprising at least one reducing agent suitable to reduce the metal ions to metallic state (at least the palladium ions) adsorbed on the surface of said substrate selected from the group consisting of boron based reducing agents, sources of hypophosphite ions, hydrazine and hydrazine derivatives, ascorbic acid, iso-ascorbic acid, sources of formaldehyde, glyoxylic acid, sources of glyoxylic acid, glycolic acid, formic acid, sugars, and salts of aforementioned acids.

(vi) treating the substrate of step (v) with an electroless copper plating bath to obtain a copper layer onto the layer of step (v).

The electroless copper plating bath will most effectively form a metal or metal alloy layer on the surface obtained from step (v). Generally, the plating bath comprises a solvent, typically water, and at least one source of metal ions to be deposited. Further optional components are complexing agents (or chelating agents) for said metal ions (e.g. those mentioned below), reducing agents for said metal ions, stabilizing agents, co-solvents, wetting agents and functional additives such as brighteners, accelerators, suppressors, anti-tarnish agents. Such baths and components are known in the art. The electroless copper plating bath may further comprise sources of nickel ions, sources of cobalt ions and mixtures thereof.

(vii) treating the substrate of step (vi) or of step (iv) in case layer of carbon or conductive polymers deposited on the substrate with an electrolytic copper or nickel plating bath to obtain a copper layer or nickel layer onto the surface while filling the BMV with copper or nickel. The copper or nickel layer can be a copper alloy or a nickel alloy comprising alloying metals as tungsten, silver.

In a preferred embodiment of the invention the electrolytic plating bath in step (vii) is an electrolytic copper plating bath to obtain a copper layer. The resulting substrate of step (vii) can be used to build a multilayer assembly by using the following steps:

In one embodiment the copper layer of step (vii) can be structured by process steps (viia) known in the art to obtain a conductive structure.

(viii) laminating the copper layer of the substrate of step (vii) or structured copper layer of steps (via) with a further nonconductive layer basing on a composite of organic polymers and glass filler.

(ix) treating the nonconductive layer of the substrate of step (viii) with laser drilling to produce recess structures as BMVs within the nonconductive layer wherein the bottom of the BMVs are formed by the surface of the copper layer (the BMVs are drilled up to the surface of the copper layer).

(x) treating the substrate of step (ix) with a desmear process of the drilled substrate of step (ix) comprising e.g. the following subsequent steps: a sweller treatment, a permanganate treatment and a reducer treatment or optionally treatment with an aqueous conditioner solution.

The substrate of step (x) can be treated again with the steps (iii) to (vii) or also repeating the other steps, if more alternating layers are needed.

If needed, additional steps as rinsing steps e.g. with DI water or aqueous acidic or alkaline solutions; etch cleaner steps; pre-dip steps; and/or drying steps can be conducted between the steps above.

The used bath compositions and solutions as such except of the inventive solution in the steps above are well-known in the art. Suitable solutions for desmear process, palladium activation solution, palladium reduction solution, electroless and electrolytic copper solution are known to the public and can be purchased e.g. as Securiganth® MV, Neoganth® MV Activator, Neoganth® MV Reducer, Printoganth® MV and Cupracid® AC from Atotech Deutschland GmbH.

The invention will now be illustrated by reference to the following figures and non-limiting examples.

EXAMPLES

The relative ratio of the used compounds of the present invention within the examples were found as preferable useful but are not considered as limiting.

I. Evaluation of Glass Filler Removal Performance

I.1 Procedure

All tested substrates comprised a nonconductive layer basing on a composite of organic polymers and glass filler (layer thicknesses ranged from 35 μm to 40 μm, and glass filler content varied between 42 and 74 wt %. The size of the embedded glass filler was an average of 0.5 μm in diameter, with a maximum of 5.0 μm) and a copper layer (Cu-cladded FR4 cores) attached to the nonconductive layer, wherein the nonconductive layer was laser drilled in order to obtain BMVs with diameters of about 40 μm (arranged in grids of 10×10 BMVs and 500 μm edge length) and the substrate was desmear treated before applying the test solution of the inventive aqueous alkaline cleaner solution and other non-inventive solutions.

The glass filler removal performance was evaluated via microscopic imaging with SEM. The coupons were reduced in size as necessary and sputtered with iridium for 60 seconds in a tilted stage (30°) in order to assure a sufficient conductivity at the wall of the blind micro via (BMV). SEM measurements were also performed on a stage tilted by 30°, making sure to tilt in the same direction as during sputtering. Imaging was done using the secondary electron (SE) detector at magnifications of 1 k to 5 k.

The glass filler removal performance is judged according to an in-house 0-5 level scale (0=no loose glass filler (means all loose glass filler is removed); 5=maximum of loose glass filler (means very less glass filler is removed) and noted for each SEM picture. According to the 6 level scale, up to 3 is still acceptable wherein 4 and 5 are not acceptable and leads to undesired plating results.

As an example for evaluation, FIG. 1 illustrates the in-house 0-5 level scale to evaluate the performance of glass filler removal by SEM on the surface of the nonconductive layer of the substrate after applying the test solution.

Figure 2:
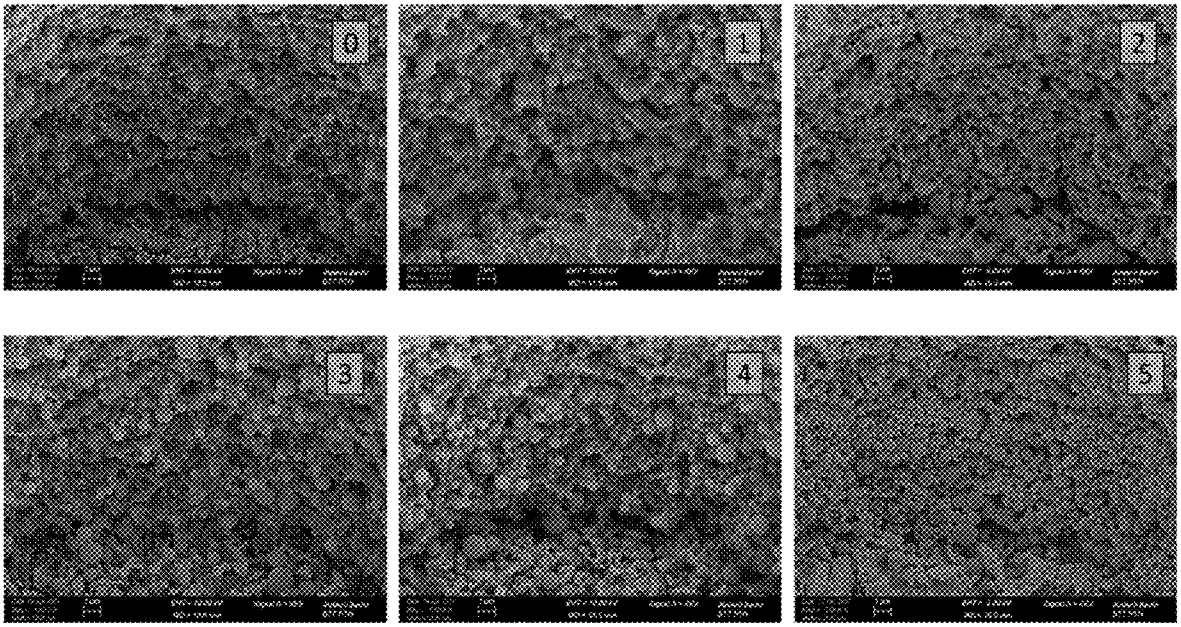
FIG. 2 illustrates the in-house 0-5 level scale to evaluate the performance of glass filler removal by SEM on the walls of a BMV of the nonconductive layer of the substrate after applying the test solutions.

As an example for evaluation FIG. 2 illustrates the in-house 0-5 level scale to evaluate the performance of glass filler removal by SEM on the walls of a BMV of the nonconductive layer of the substrate after applying the test solutions.

Test Examples (Inventive Examples and Comparative Example)

After desmear process, the substrates were treated with the inventive aqueous alkaline cleaner solution having a solution temperature of 60° C. and a dwelling time of 5 min. All components of the test solutions were diluted in DI (DI—De-Ionized water). After this the substrates were prepared for each SEM picture analysis as described above to evaluate the glass filler removal performance.

Inventive Example 1 (I1)

Concentrations in the solution:

| | |
|---|---|
| Hexanoic acid | 1.4 g/L |
| Sodium etasulfate | 0.8 g/L |
| ethoxylated hexan-1-ol (Cas 31726-34-8) | 1.1 g/L |
| Sodium hydroxide (NaOH) | 84 g/L |
| MEA - Monoethanolamine (>98%) | 6.5 g/L |

Figure 3:
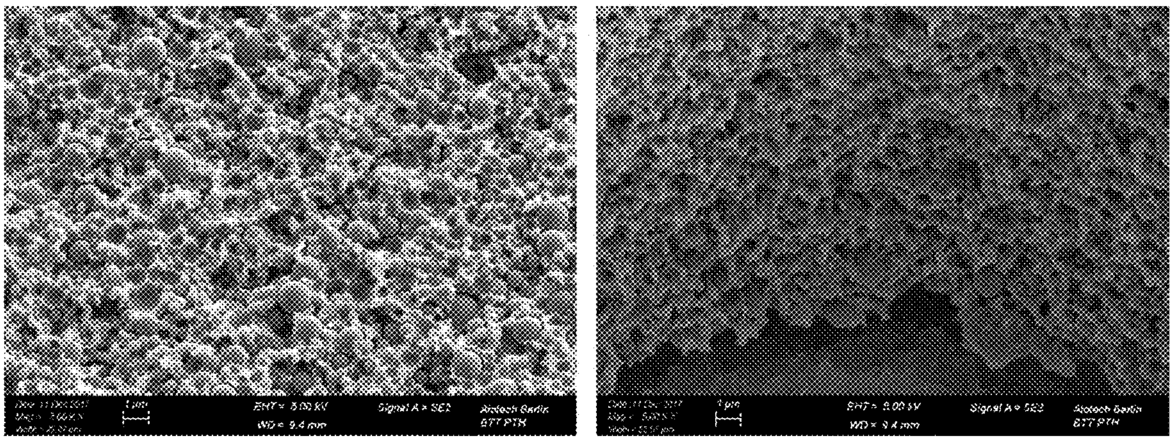
FIG. 3 illustrates the results of the glass filler removal performance on the surface and in the BMV according to Inventive example 1 by SEM.

The glass filler removal performance via SEM imaging, magnification=5kx, shown on the surface was 0.5 (Left: surface area in between BMVs) and in the BMV was 1 (Right: side walls of the BMV, edge of the capture pad is visible) in FIG. 3.

Inventive Example 2 (I2)

Concentrations in the solution:

| | |
|---|---|
| Hexanoic acid | 1.4 g/L |
| 1-amino-hexyl carboxylate | 8 g/L |
| ethoxylated decan-1-ol (CAS 26183-52-8) | 1.0 g/L |
| NaOH | 84 g/L |

Figure 4:
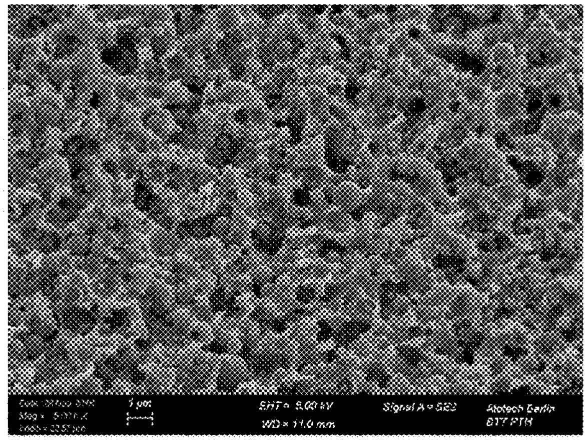
FIG. 4 illustrates the results of the glass filler removal performance on the surface according to Inventive example 2 by SEM.

The glass filler removal performance via SEM imaging, magnification=5kx, shown on the surface was 1 in FIG. 4.

Inventive Example 3 (I3)

Concentrations in the solution:

| | |
|---|---|
| Hexanoic acid | 1.4 g/L |
| APG (CAS 54549-24-5) | 0.75 g/L |
| 2-ethylhexyl imino dipropionate | 2 g/L |
| NaOH | 84 g/L |

Figure 5:
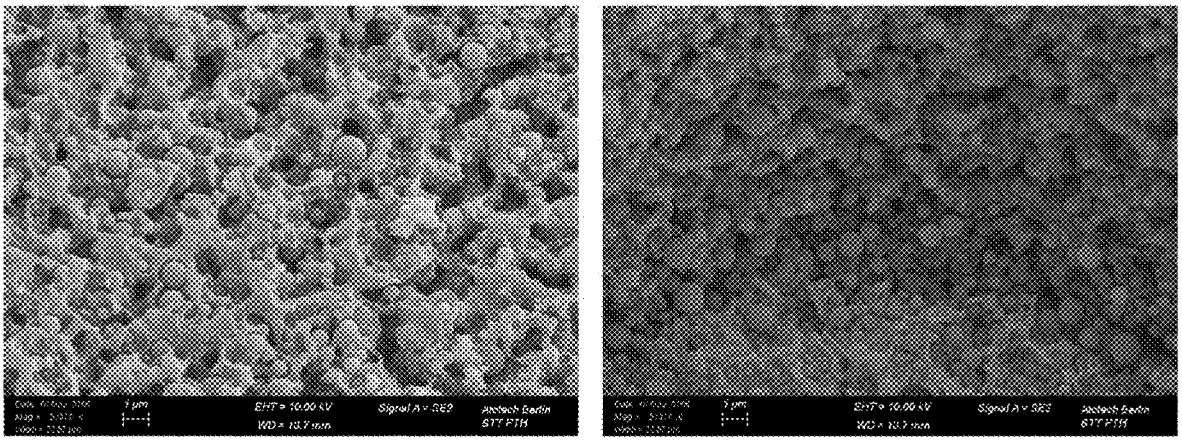
FIG. 5 illustrates the results of the glass filler removal performance on the surface and in the BMV according to Inventive example 3 by SEM.

The glass filler removal performance via SEM imaging, magnification=5kx, shown on the surface was 3 (Left: surface area in between BMVs) and in the BMV was 3 (Right: side walls of the BMV, edge of the capture pad is visible) in FIG. 5.

Comparative Example 1 (C1)

Concentrations in the solution:

| | |
|---|---|
| NaOH | 84 g/L |

Figure 6:
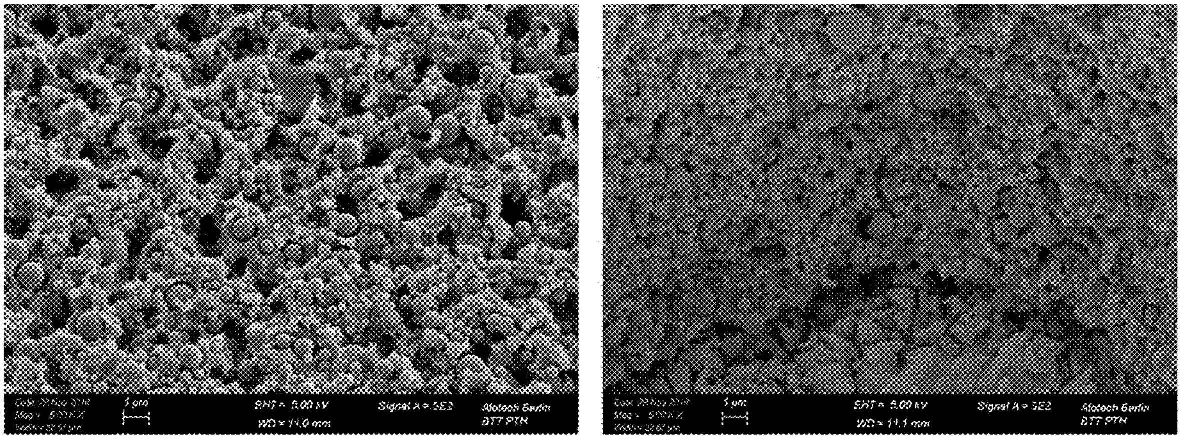
FIG. 6 illustrates the results of the glass filler removal performance on the surface and in the BMV according to Comparative example 1 by SEM.

The glass filler removal performance via SEM imaging, magnification=5kx, shown on the surface was 4.5 (Left: surface area in between BMVs) and in the BMV was 4.5 (Right: side walls of the BMV, edge of the capture pad is visible) in FIG. 6.

Comparative Example 2 (C2) and Inventive Example 1 (I1)

Concentrations in the solution of C2:

| | |
|---|---|
| MEA (>98%) | 12.37 g/L |
| Polyethylenglycol-(4-tert-octylphenyl)-ether (CAS 9002-93-1) | 4.12 g/L |
| 2-Propanol | 1.03 g/L |
| Guanidinium chloride >= 96% | 1.65 g/L |

The desmear treated substrate was pre-treated with in a conditioner step (0) treating the desmear treated substrate with an aqueous conditioner solution before the solutions of C2 and I1 were applied on this pre-treated desmear treated substrate. The conditioner step (0) was performed with the Securiganth® MV Reduction Conditioner available from Atotech Deutschland GmbH.

Figure 7:
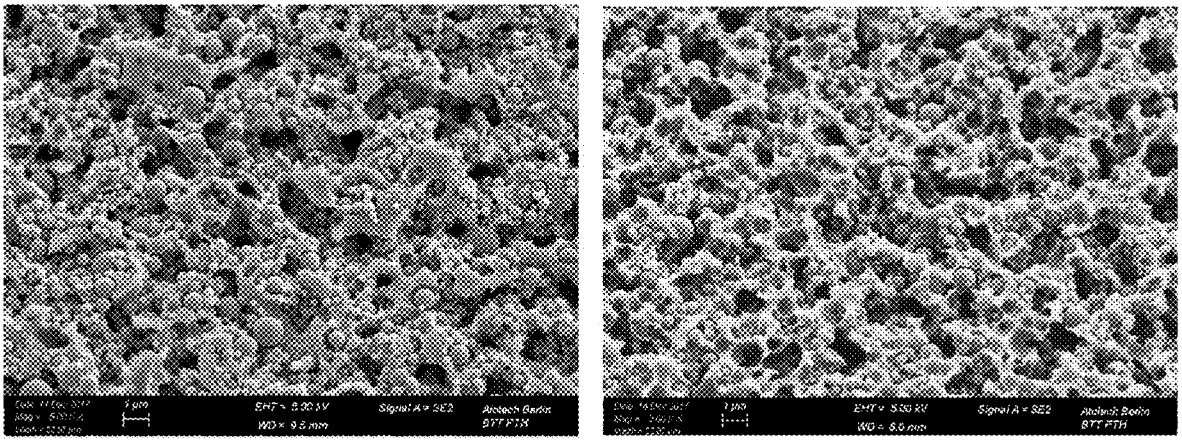
FIG. 7 illustrates the results of the glass filler removal performance on the surface and in the BMV according to Comparative example 2 by SEM.

The glass filler removal performance via SEM imaging, magnification=5kx, shown on the surface was 5 for C2 (Left: surface area in between BMVs) and was 3 for I1 (Right: surface area in between BMVs) in FIG. 7.

The following comparative examples C3, C4 and C5 were prepared as follows and conducted in parallel with the composition of inventive examples I1 (see above):

Comparative Example 3 (C3) According to JP 2010-229536 A (Par. [0015, 10 Min, 80° C.])

Concentrations in the solution of C3:

| | |
|---|---|
| MEA | 5.00 g/L |
| EDA | 5.00 g/L |

-continued

| | |
|---|---|
| Polyoxyethylene β-naphthyl ether (Cas-Nr. 35545-57-4) | 10.00 g/L |
| Potassium hydroxide | 50.00 g/L |

Comparative Example 4 (C4) Using Surfactant of JP 2010-229536 A (5 Min, 60° C.)

Concentrations in the solution of C4:

| | |
|---|---|
| MEA | 6.50 g/L |
| Polyoxyethylene β-naphthyl ether (Cas-Nr. 35545-57-4) | 10.00 g/L |
| NaOH | 84.00 g/L |

Comparative Example 5 (C5) Using Surfactant of JP 2010-229536 A (5 Min, 60° C.)

Concentrations in the solution of C5:

| | |
|---|---|
| MEA | 6.50 g/L |
| Polyoxyethylene β-naphthyl ether (Cas-Nr. 35545-57-4) | 1.00 g/L |
| NaOH | 84.00 g/L |

The desmear treated substrate was pre-treated with in a conditioner step (0) treating the desmear treated substrate with an aqueous conditioner solution before the solutions of C3, C4, C5 and 11 were applied on this pre-treated desmear treated substrate. The conditioner step (0) was performed with the Securiganth® MV Reduction Conditioner available from Atotech Deutschland GmbH.

Figure 8:
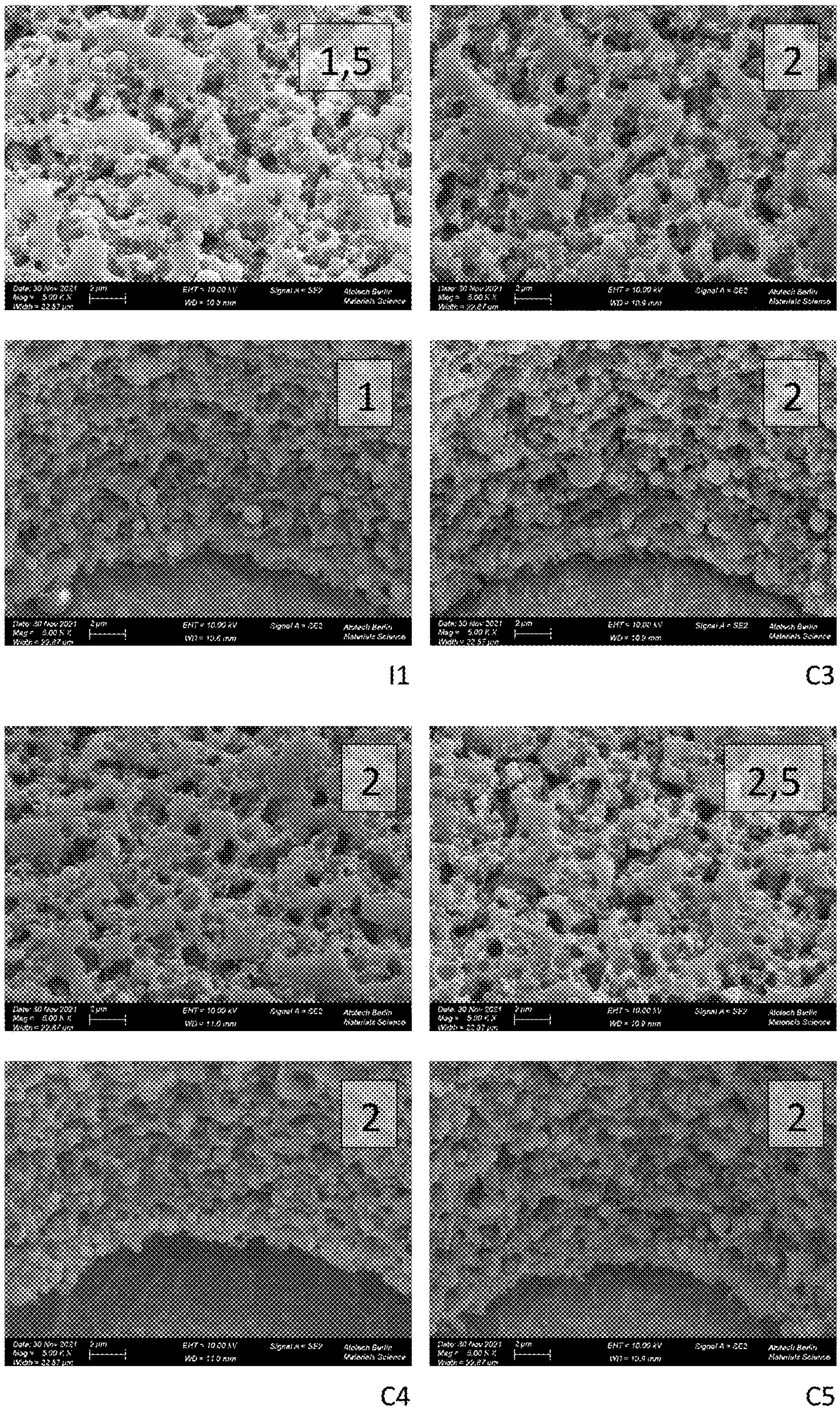
FIG. 8 illustrates the results of the glass filler removal performance on the surface and in the BMV according to Comparative example 3, 4, 5 and Inventive example 1 by SEM.

The glass filler removal performance via SEM imaging, magnification=5kx, shown in FIG. 8 on the surface of the substrate and on the surface area of the BMVs was 2 to 2.5 for C3, C4 and C5. and was 1 to 1.5 for 11 on the surface of the substrate and on the surface area of the BMVs.

Beside the glass filler removal performance of the comparative example C3, C4 and C5 was not as good as the inventive example 11, strong problems were observed in view of peel strength (see below). Also turbidity at working temperature was strong in contrast to a total clear working solution of the inventive example 11, as well stronger foaming behavior was observed.

II. Evaluation of Foaming of the Aqueous Alkaline Cleaner Solution

To evaluate the foaming behaviour a 100-ml graduated cylinder is used. The cylinder was filled with 50 ml of a test solution and closed. After starting a stopwatch, the cylinder was shaken for 10 seconds and test solution was almost converted to a test solution foam. With the end of shaking the foam will begin to clear away wherein the foam will recover to a test solution without foam over time. After a total time of 60 seconds, the volume of the remaining foam of the test solution was determined. The faster the foam clears away the better.

Table I shows the foaming behaviour of an inventive aqueous alkaline cleaner solution according inventive example I1 and the comparative example C2. It can be seen that the inventive example I1 displays significantly less foam and fast clear away of the foam than the comparative example C2, thereby demonstrating the markedly improved foaming characteristics of inventive example I1.

TABLE I

| Example/Time | 60 sec |
|---|---|
| Inventive examples I1 | 55 ml |
| Comparative example C2 | 85 ml |

III. Adhesion Investigation

After desmear process, the two desmear treated substrates were treated in an additional experiment with the inventive aqueous alkaline cleaner solution according to inventive example I1 and a solution according to comparative example C2, C3, C4 and C5.

Subsequently, the two substrates were treated as follows: palladium activation solution, palladium reduction solution, and electroless copper solution are known to the public and can be purchased e.g. as Securiganth® MV, Neoganth® MV Activator, Neoganth® MV Reducer, and Printoganth® MV from Atotech Deutschland GmbH.

| Process | Chemistry | Setpoint [mL/L ] | Temp [° C.] | Dwell time [min] |
|---|---|---|---|---|
| Activator | Neoganth MV Activator | 40 mL/L (200 ppm) | 45 | 4 |
| | 45% NaOH | 5.5 mL/L (MU) | | |
| | pH | 11.3 | | |
| Reducer | Neoganth MV Reducer | 8 | 30 | 3 |
| E'less copper | Printoganth MV Basic TP1 | 140 | | |
| (MV TP1) | Printoganth MV Copper TP1 | 85 | 34 | |
| | Printoganth MV Moderator TP1 | 3 | | 20 |
| | Printoganth MV Stabilizer TP1 | 0.6 mL/L (MU) | | |
| | Cu Reduction Solution | 16 | | |
| | pH-Correction Solution CC | 7 mL/L (3 g/L) | | |

In the peel strength experiments it can be seen the increase in copper to resin adhesion and that using the aqueous alkaline cleaner solution I1 gives significantly higher adhesion values than using the solution C2 (Tab. II) or the solutions C3, C4 and C5 compared with I1 (Tab. III). Besides this, a strong improved blister performance was found.

TABLE II

| Peel strength [N/cm] | | |
|---|---|---|
| Example/Substrate | Substrate 1 | Substrate 2 |
| Inventive examples I1 | 9N/cm | 5N/cm |
| Comparative example C2 | 7.8N/cm | 2.2N/cm |

TABLE III

| | | peel strength [N/cm] | | | | | |
|---|---|---|---|---|---|---|---|
| | Substrate | 1 | 2 | 3 | 4 | mean | dev |
| I1 | 1 | 8.4 | 8.5 | 8.3 | 8.6 | 8.5 | 0.1 |
| C3 | 1 | 6.4 | 6.5 | 5.8 | 6.0 | 6.2 | 0.3 |
| C4 | 1 | 6.6 | 6.5 | 5.0 | 5.0 | 5.8 | 0.9 |
| C5 | 1 | 6.3 | 5.8 | 4.9 | 5.0 | 5.5 | 0.7 |

Peel strength [N/cm] according to C3, C4, C5 and I1

The invention claimed is:

1. Aqueous alkaline cleaner solution for glass filler removal comprising:
   - (a) at least one surfactant selected from the group consisting of saturated branched or unbranched C5 to C12 carboxylic acid and salts thereof, wherein the concentration of the (a) at least one surfactant is from 0.9 to 1.7 g/L;
   - (b) at least one surfactant selected from the group consisting of a saturated branched or unbranched C5 to C12 alkyl having a negatively charged group selected from sulfate, sulfite, phosphate, phosphite and carbonate; or saturated C3-C8 alkyl amino carboxylate;
   - (c) at least one compound having at least one hydroxyl group and at least one C—O—C group selected from the group consisting of alkoxylated C5-C12 alkanol and glycosidic C5-C12 alkanol; and
   - (d) alkali metal hydroxide, wherein the concentration of the (d) alkali metal hydroxide is from 65 to 200 g/L, wherein the aqueous alkaline cleaner solution has a pH of greater than 14.

2. Aqueous alkaline cleaner solution according to claim 1 wherein the concentration of the (a) at least one surfactant is from 1.0 to 1.5 g/L.

3. Aqueous alkaline cleaner solution according to claim 1 wherein the concentration of the (b) at least one surfactant is from 0.5 to 10 g/L.

4. Aqueous alkaline cleaner solution according to claim 1 wherein the concentration of the (c) at least one compound is from 0.6 to 1.3 g/L.

5. Aqueous alkaline cleaner solution according to claim 1 wherein the concentration of the (d) alkali metal hydroxide is from 70 to 100 g/L.

6. Aqueous alkaline cleaner solution according to claim 1 wherein the (a) at least one surfactant is selected from the group consisting of saturated branched C6 to C10 carboxylic acid and salts thereof.

7. Aqueous alkaline cleaner solution according to claim 1 wherein the (b) at least one surfactant is selected from the group consisting of saturated branched or unbranched C5 to C8 alkyl having a negatively charged group selected from sulfate, phosphate, or carbonate; and saturated C5-C8 alkyl amine carboxylate.

8. Aqueous alkaline cleaner solution according to claim 1 wherein the (c) at least one compound is selected from the group consisting of an alkoxylated C5-C12 alkanol of formula (I)

(I)

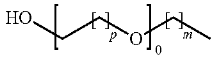

wherein p is an integer from 1 to 2, o is an integer from 4 to 10 and m is an integer from 4 to 9 and wherein the (c) at least one compound is a glycosidic C5-C12 alkanol of formula (II)

(II)

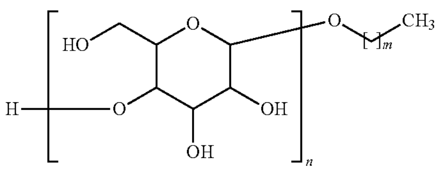

wherein n is an integer from 1 to 5 and m is an integer from 4 to 9.

9. Aqueous alkaline cleaner solution according to claim 1 wherein the solution further comprises (e) at least one water-soluble alkanolamine, selected from the group consisting of monoethanolamine (MEA), diethanolamine (DEA) and triethanolamine (TEA).

10. Aqueous alkaline cleaner solution according to claim 9 wherein the concentration of the (e) at least one water-soluble alkanolamine is from 6.5 to 9.0 g/L.

11. Method for glass filler removal treatment of a desmear treated substrate comprising a nonconductive layer basing on a composite of organic polymers and glass filler and a copper layer attached to the nonconductive layer in manufacturing an article with an integrated circuit, wherein the nonconductive layer has at least one blind micro via within the surface of the nonconductive layer, wherein the bottom of the at least one micro via is built by the attached copper layer, wherein the surface of the nonconductive layer which is not attached to the copper layer and the wall of the at least one blind micro via expose desmear treated organic polymers and glass filler, wherein the method comprising the steps in the following order:
   - (i) providing the desmear treated substrate;
   - (ii) providing the aqueous alkaline cleaner solution according to claim 1;
   - (iii) treating the substrate with the aqueous alkaline cleaner solution by bringing the substrate into contact with the alkaline cleaner solution in order to remove glass filler from the organic polymer.

12. Method of claim 11, wherein the (iii) treating is conducted at 55 to 65° C. for 3 to 7 min.

13. Method according to claim 11, wherein the method further comprises the step:
   - (iv) treating the substrate of step (iii) with an activation solution onto the surfaces of the nonconductive layer of the treated substrate of step (iii) for subsequent metallization.

14. Method according to claim 11 wherein the copper layer attached to the nonconductive layer is further attached to a core layer.

15. Aqueous alkaline cleaner solution according to claim 1 wherein the (a) at least one surfactant is selected from the group consisting of hexanoic acid and octanoic acid and salts thereof; the (b) at least one surfactant is selected from the group consisting of sodium 2-ethylhexyl sulfate, sodium iso-heptyl sulfate and alkyl amino carboxylate according to formula (III)

(III)

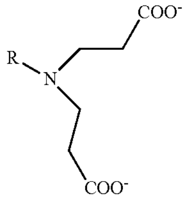

wherein R is 2-ethylhexyl or n-octyl, and according to formula (IV)

(IV)

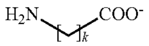

wherein k is from 4 to 6; the (c) at least one compound is selected from the group consisting of a compound of formula (I) wherein the compound is ethoxylated hexanol, ethoxylated octanol or ethoxylated decanol wherein o is 6, and a compound of formula (II) wherein n is an integer from 1 to 5 and m is an integer from 5-7; and (d) is alkali metal hydroxide.

16. Aqueous alkaline cleaner solution according to claim 15 wherein the aqueous alkaline cleaner solution further comprises (e) at least one water-soluble alkanolamine.

17. Method for glass filler removal treatment of a desmear treated substrate comprising a nonconductive layer basing on a composite of organic polymers and glass filler and a copper layer attached to the nonconductive layer in manufacturing an article with an integrated circuit, wherein the nonconductive layer has at least one blind micro via within the surface of the nonconductive layer, wherein the bottom of the at least one micro via is built by the attached copper layer, wherein the surface of the nonconductive layer which is not attached to the copper layer and the wall of the at least one blind micro via expose desmear treated organic polymers and glass filler, wherein the method comprising the steps in the following order:

(i) providing the desmear treated substrate;

(ii) providing the aqueous alkaline cleaner solution according to claim 15;

(iii) treating the substrate with the aqueous alkaline cleaner solution by bringing the substrate into contact with the alkaline cleaner solution in order to remove glass filler from the organic polymer.

18. Method for glass filler removal treatment of a desmear treated substrate comprising a nonconductive layer basing on a composite of organic polymers and glass filler and a copper layer attached to the nonconductive layer in manufacturing an article with an integrated circuit, wherein the nonconductive layer has at least one blind micro via within the surface of the nonconductive layer, wherein the bottom of the at least one micro via is built by the attached copper layer, wherein the surface of the nonconductive layer which is not attached to the copper layer and the wall of the at least one blind micro via expose desmear treated organic polymers and glass filler, wherein the method comprising the steps in the following order:

(i) providing the desmear treated substrate;

(ii) providing the aqueous alkaline cleaner solution according to claim 16;

(iii) treating the substrate with the aqueous alkaline cleaner solution by bringing the substrate into contact with the alkaline cleaner solution in order to remove glass filler from the organic polymer.

19. Method according to claim 11, wherein the method is used before an activation of the surface of the nonconductive layer of the desmear treated substrate for subsequent metallization of the substrate for the manufacturing an article with an integrated circuit.

20. Aqueous alkaline cleaner solution for glass filler removal comprising: (a) at least one surfactant selected from the group consisting of saturated branched or unbranched C5 to C12 carboxylic acid and salts thereof, wherein the concentration of the (a) at least one surfactant is from 0.9 to 1.7 g/L; (b) at least one surfactant selected from the group consisting of a saturated branched or unbranched C5 to C12 alkyl sulfate; (c) at least one compound having at least one hydroxyl group and at least one CO—C group selected from the group consisting of alkoxylated C5-C12 alkanol and glycosidic C5-C12 alkanol; and (d) alkali metal hydroxide, wherein the concentration of the (d) alkali metal hydroxide is from 65 to 200 g/L.

* * * * *